United States Patent
Hsieh

[11] Patent Number: 6,054,824
[45] Date of Patent: Apr. 25, 2000

[54] DRIVE CIRCUIT WITH SIGNAL DETECTION CAPABILITY FOR A DC BRUSHLESS FAN MOTOR

[76] Inventor: Hsin-Mao Hsieh, No. 6, East Section, Chiao Nan Li, Industrial 6th Rd., Pingtung City, Pintung Hsien, Taiwan

[21] Appl. No.: 09/105,821

[22] Filed: Jun. 26, 1998

[51] Int. Cl.[7] .................................................. H02P 8/00
[52] U.S. Cl. ........................ 318/445; 318/685; 318/473; 318/254
[58] Field of Search ................... 318/138, 254, 318/245, 685, 696, 430–490; 340/635, 641, 648; 361/20–32, 695, 687; 417/44, 11; 242/186, 57, 191; 324/158 MG, 117 H

[56] References Cited

U.S. PATENT DOCUMENTS

| | | | |
|---|---|---|---|
| 4,506,218 | 3/1985 | Brown et al. | 324/158 MG |
| 4,535,274 | 8/1985 | Suzuki et al. . | |
| 4,644,238 | 2/1987 | Hirosaki | 318/332 |
| 4,992,717 | 2/1991 | Marwin et al. | 318/696 |
| 5,152,477 | 10/1992 | Yeh | 242/186 |
| 5,309,076 | 5/1994 | Madsen et al. . | |
| 5,448,143 | 9/1995 | Pecone | 318/434 |
| 5,554,913 | 9/1996 | Ohsawa | 318/434 |
| 5,604,654 | 2/1997 | Wille et al. | 361/23 |
| 5,726,911 | 3/1998 | Canada et al. | 364/550 |
| 5,727,928 | 3/1998 | Brown | 417/44.11 |
| 5,889,469 | 3/1999 | Mykytiuk et al. | 340/635 |
| 5,898,288 | 4/1999 | Rice et al. | 318/685 |

FOREIGN PATENT DOCUMENTS 0 467 085 A1  1/1992  Germany .

*Primary Examiner*—Paul Ip
*Attorney, Agent, or Firm*—Holland & Hart LLP

[57] ABSTRACT

A drive circuit with signal detection capability for a DC brushless fan motor is disclosed. The drive circuit comprises a Hall effect sensor for detecting the magnetic polarity of the rotor in the fan motor, first and second transistors connected to first and second magnetic coils respectively for alternately generating magnetic fields to continuously rotate the rotor of the fan motor and further comprises a series RC circuit and a field effect transistor for detecting the operation of the fan motor. A signal detection line connected to the source of the field effect transistor is provided for detecting the operation of the fan motor. When the fan motor is running normally, the signal detection line presents a square wave signal with frequency proportional to the rotating speed of the fan motor. When the motor stops running, the signal detection line always presents a high level signal. The field effect transistor is powered up by an external power source whereby the magnitude of the detected signal on the detection line is adjustable.

3 Claims, 4 Drawing Sheets

6,054,824

DRIVE CIRCUIT WITH SIGNAL DETECTION CAPABILITY FOR A DC BRUSHLESS FAN MOTOR

BACKGROUND OF THE INVENTION

1. Field of the Invention

The present invention relates to a fan motor drive circuit; more particularly, relates to a DC brushless fan motor drive circuit capable of detecting the operation of the fan motor.

2. Description of Related Art

FIG. 7 is a circuit diagram showing a conventional drive circuit for driving a DC brushless fan motor. The drive circuit comprises a Hall effect sensor 40 for detecting the polarity of a rotor formed of a permanent magnet in the fan motor, a first transistor 10 connected to a first magnetic coil L1, and a second transistor 20 connected to a second magnetic coil L2. The Hall effect sensor 40 has one input terminal connected to a fan motor power input Vin and the other input terminal connected to a grounding line. The first transistor 10 has a collector connected to the fan motor power input Vin through the first magnetic coil L1, an emitter connected to the grounding line and a base connected to an output terminal of the Hall effect sensor 40. The second transistor 20 has a collector connected to the fan motor power input Vin through the second magnetic coil L2, an emitter connected to the grounding line and a base connected to the collector of the first transistor.

In use of the drive circuit of FIG. 7, when the fan motor is powered on, the first transistor 10 is turned on and current is supplied to the first magnetic coil L1 thereby generating a magnetic field to rotate the rotor. Then, the Hall effect sensor 40 detects the change of magnetic polarity caused by the rotation of the rotor thereby generating a high level signal to turn off the first transistor 10 and turn on the second transistor 20 for supplying current to the second magnetic coil L2. Again, the magnetic coil L2 generates a magnetic field to rotate the rotor. Consequently, the first transistor 10 and the second transistor 20 are alternately turned on and turned off for supplying current to the first magnetic coil L1 and second magnetic coil L2 respectively thereby continuously rotating the rotor.

The conventional drive circuit as shown in FIG. 7 is only used for rotating the rotor of the fan motor. It is hard to know whether the operation of the fan motor is normal or not. However, a fan motor may be unstable or even out of order after running for a long time, which may affect other electronic elements cooperated with the fan motor in an environment where heat dissipation is strictly important. Therefore, it is desired to detect the operation of the fan motor from the drive circuit. One solution is to provide the drive circuit with a signal detection line connected to the base or collector of the first or second transistor 10,20. From such a signal detection line, a square wave signal, whose frequency is proportional to the rotating speed of the fan motor, is obtained and the operation of the fan motor can be known. However, the amplitude of this square wave signal is restricted by the fan motor power input Vin, and as a result, it can not be adjusted to meet the actual requirement. Moreover, when the fan motor is out of order and stops running, the detected signal presented on the signal detection line is unpredictable; more specifically, the signal detection line may present a high level signal or a low level signal depending on the position where the rotor stops. Therefore, there is a continued need for the above drive circuit to be improved.

The present invention provides an improved drive circuit for a DC brushless fan motor to mitigate and/or obviate the aforementioned problems.

SUMMARY OF THE INVENTION

One object of the present invention is to provide a fan motor drive circuit with signal detection capability wherein the magnitude of the detected signal is adjustable so that the detected signal can be used in various applications.

Another object of the present invention is to provide a fan motor drive circuit with signal detection capability wherein the detected signal is a square wave signal with frequency proportional to the rotating speed of the fan motor when the fan motor is running, and wherein the detected signal has a specific voltage level such as a high level when the fan motor is out of order and stops running, whereby a breakdown of the fan motor can be clearly detected.

The fan motor drive circuit of the present invention comprises a Hall effect sensor for detecting the polarity of the rotor in the fan motor, a first transistor connected to a first magnetic coil and a second transistor connected to a second magnetic coil for generating magnetic fields to rotate the rotor of the fan motor, and further comprises a series RC circuit and a field effect transistor for detecting the operation of the fan motor.

Other objects, advantages, and novel features of the invention will become more apparent from the following detailed description when taken in conjunction with the accompanying drawings.

DETAILED DESCRIPTION OF PREFERRED EMBODIMENT

Figure 7:
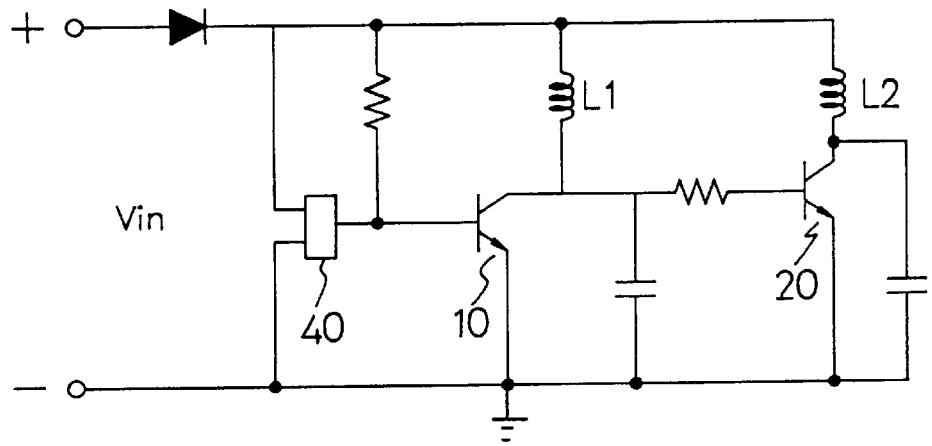
FIG. 7 is a circuit diagram of a conventional drive circuit for a DC brushless fan motor.
Figure 1:
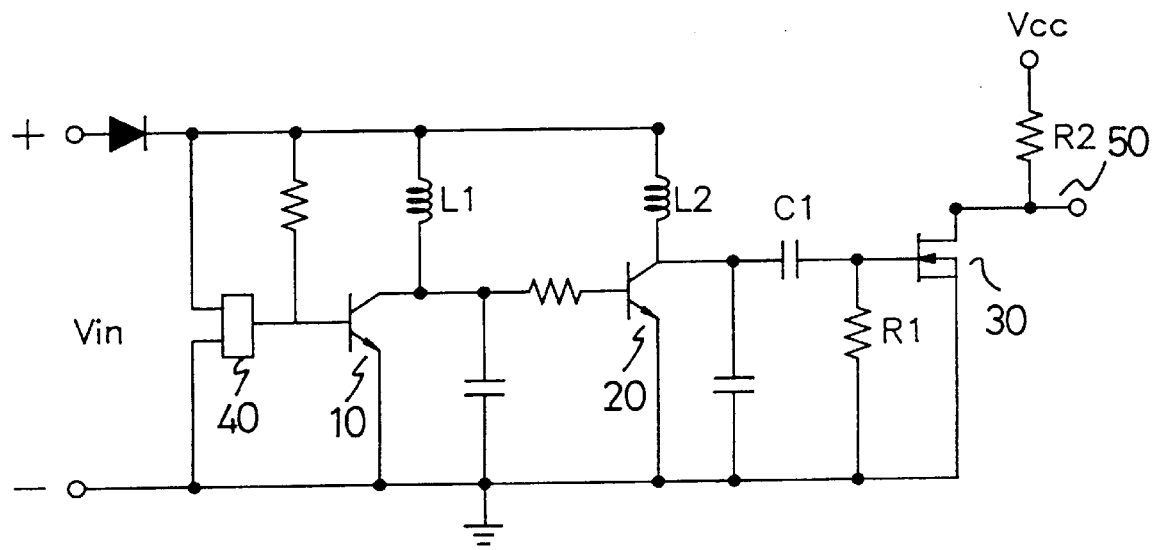
FIG. 1 is a circuit diagram of a drive circuit for a DC brushless fan motor in accordance with the present invention.

FIG. 1 shows a drive circuit for a DC brushless fan motor in accordance with the present invention. Like the conventional drive circuit, the present drive circuit comprises a Hall effect sensor 40 for detecting the polarity of a rotor formed of a permanent magnet in the fan motor, a first transistor 10 connected to a first magnetic coil L1 and a second transistor 20 connected to a second magnetic coil L2, wherein the first and second magnetic coils L1,L2 are controlled by the first and second transistors 10,20 respectively to alternately generate magnetic fields for continuously rotating the rotor when the fan motor is powered on by a fan motor power input Vin. To have signal detection capability, the drive circuit further includes a capacitor C1, a resistor R1 and a field effect transistor 30. The capacitor C1 has a first electrode connected to the collector of the second transistor 20 and a second electrode connected to a grounding line through the resistor R1. The field effect transistor 30, which is preferably to be an enhancement nMOS transistor, has a gate connected to the second electrode of the capacitor C1, a drain connected to the grounding line and a source connected to an external power source Vcc through a pull-up resistor R2, wherein the external power source Vcc is different from the fan motor power input Vin. Moreover, the drive circuit is provided with a signal detection line 50 connected to the drain of the field effect transistor 30 for presenting signals indicative of the operation of the fan motor.

Figure 2:
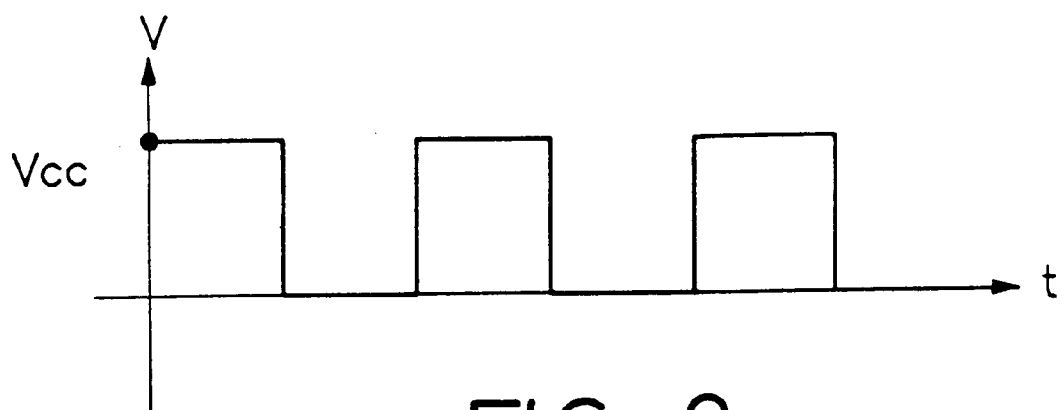
FIG. 2 shows the detected signal on a signal detection line of the drive circuit when the fan motor is running normally.

When the fan motor is running normally and the first and second transistors 10, 20 are alternately turned on and off, there is a square wave signal generated on the collector of the second transistor as mentioned previously in the conventional drive circuit. This square wave signal periodically charges a RC circuit constructed by the capacitor C1 and the resistor R1 connected in series thereby providing a periodical pulse signal and applying the same to the gate of the field effect transistor 30 so that the field effect transistor 30 is periodically turned on and off. When the field effect transistor is turned on, the voltage of the external power source Vcc is totally across on the pull-up resistor R2 and the voltage level of the drain thereof is low. Alternately, when the field effect transistor is turned off, the voltage level of the drain thereof is high and has a value equal to the voltage of the external power source Vcc. As a result, a square wave signal, whose frequency is proportional to the rotating speed of the fan motor and whose amplitude is the same as the voltage of the external power source Vcc, is obtained as shown in FIG. 2. It is appreciated that the amplitude of this square wave signal depends on the voltage of the external power source Vcc instead of the voltage of the fan motor power input Vin. Therefore, it is possible to adjust the magnitude of the amplitude of the detected signal presented on the signal detection line 50 by changing the magnitude of the voltage of the external power source Vcc.

Figure 3B:
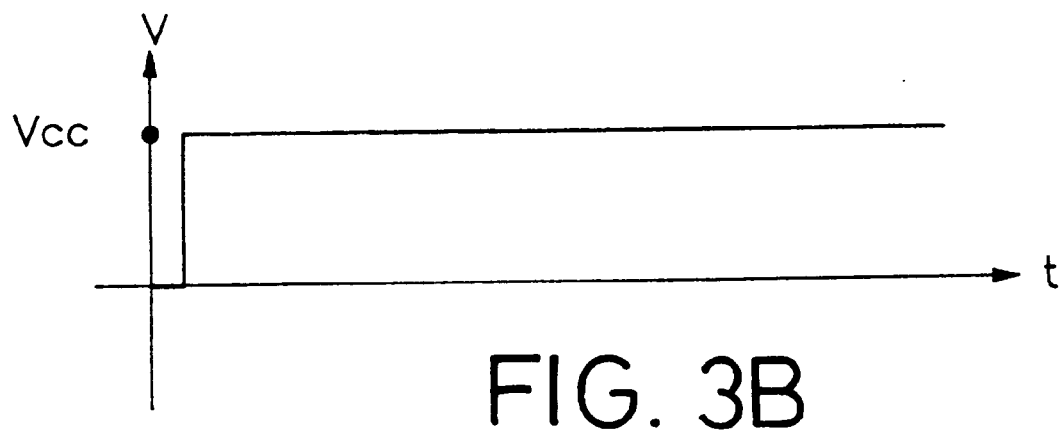
FIGS. 3A and 3B show the detected signals on the signal detection line of the drive circuit when the fan motor is out of order and stops running.
Figure 3A:
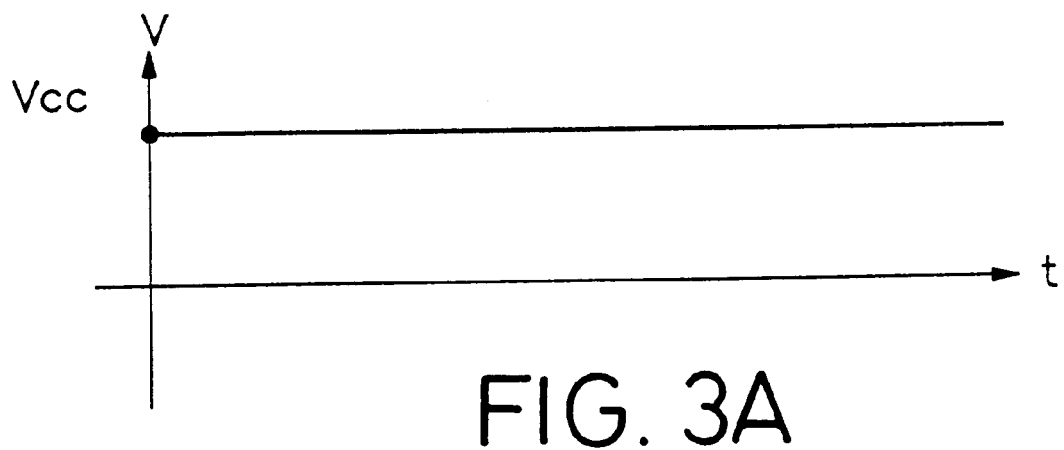

When the fan motor is out of order and stops running, the square wave signal on the collector of the second transistor 20 becomes a high level signal or a low level signal depending on where the rotor stops. When it is a low level signal, the field effect transistor 30 is turned off and the signal detection line 50 presents a high level signal as shown in FIG. 3A; when it is a high level signal, the field effect transistor 30 is also turned off because the high level signal can not pass through the capacitor C1, and the signal detection line 50 still presents a high level signal as shown in FIG. 3B. As a result, the signal detection line 50 always present a high level signal when the fan motor is out of order and stops running thereby eliminating the disadvantage that the detected signal level is unpredictable in the conventional drive circuit.

Figure 4:
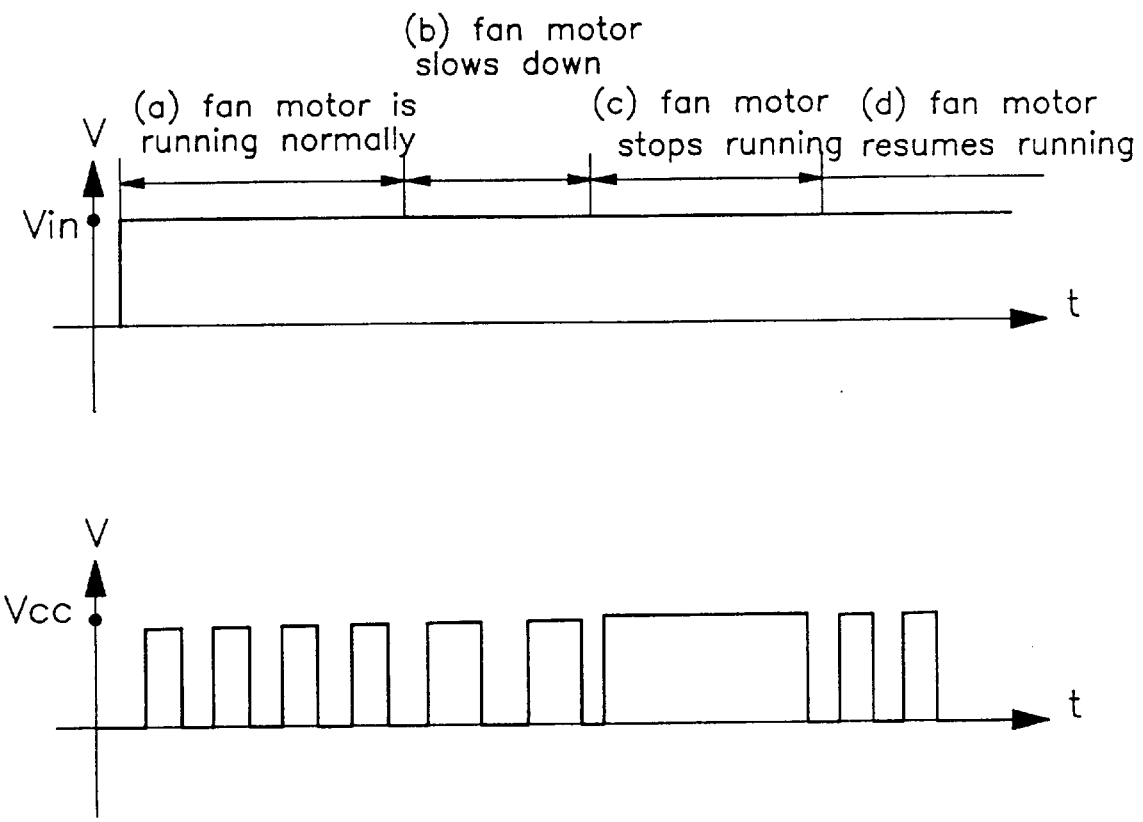
FIG. 4 shows the detected signal on the signal detection line of the drive circuit for the fan motor operating in different conditions.

In application, the rotating speed of the fan motor can be obtained according to the following formula:

RPM (Rotation Per Minute)=$(2f/N) \times 60$ where f represents the frequency of the detected signal and N represents the number of magnetic poles in the fan motor. By monitoring the rotating speed of the fan motor, an abnormal condition in the operation of the fan motor can be detected as early as possible. For clarity, FIG. 4 shows the detected signal on the signal detection line 50 for the following condition: (a) the fan motor is running normally; (b) the fan motor slows down; (c) the fan motor stops running; and (d) the fan motor resumes running.

Figure 5:
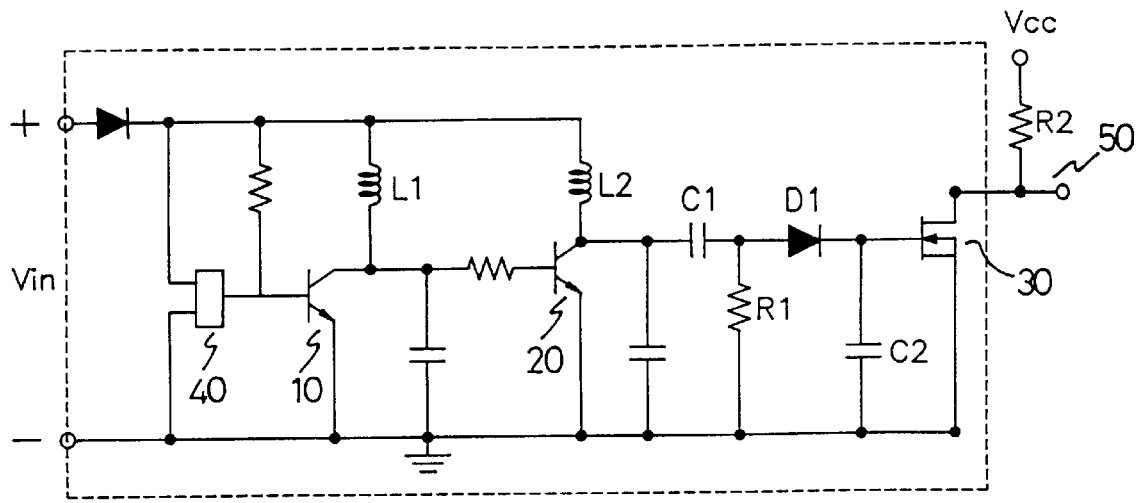
FIG. 5 is a circuit diagram of the drive circuit used for rotation detection.
Figure 6:
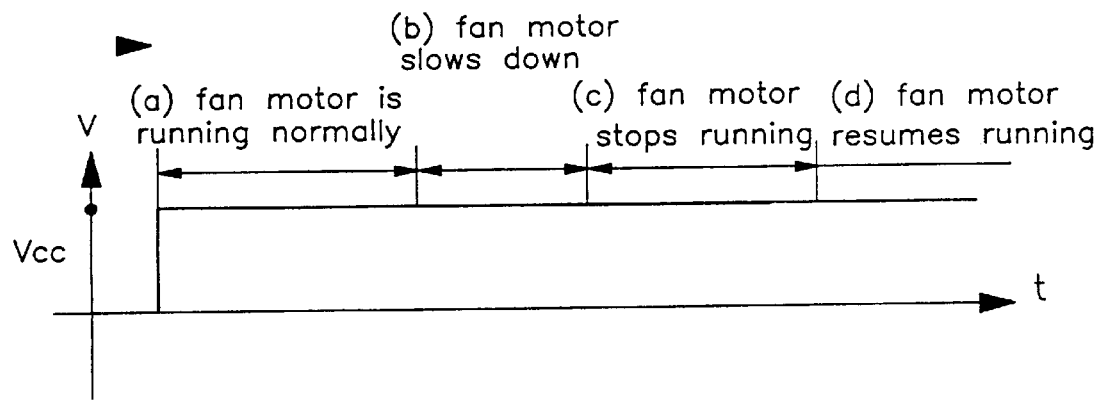
FIG. 6 shows the detected signal on the signal detection line of the drive circuit used for rotation detection.
Figure 6:
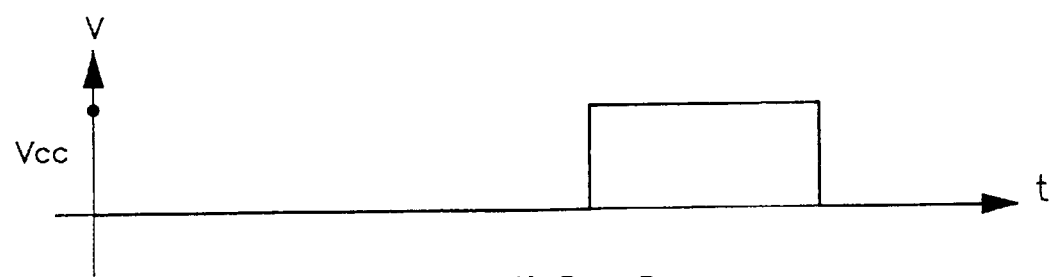

The drive circuit of present invention can be used for rotation detection. Referring to FIG. 5, the drive circuit as shown in FIG. 1 further includes a diode D1 and a second capacitor C2 for providing the rotation detection capability. The diode D1 has an anode connected to the second electrode of the capacitor C1 and a cathode connected to the gate of the field effect transistor 30; the cathode of the diode D1 is also connected to the grounding line through the capacitor C2 to provide an application circuit for rotation detection. FIG. 6 shows the detected signal on the signal detection line of the drive circuit used for rotation detection for the following conditions: (a) the fan motor is running normally; (b) the fan motor slows down; (c) the fan motor stops running; and (d) the fan motor resumes running. It is noted that the output signal is high only when the fan motor stops running whereby a breakdown in the fan motor can be detected with minimum electronic elements.

Although the present invention has been explained in relation to its preferred embodiment, it is to be understood that many other possible modifications and variations can be made without departing from the spirit and scope of the invention as hereinafter claimed.

What is claimed is:

1. A drive circuit for a DC brushless fan motor comprising:
   a Hall effect sensor for detecting the magnetic polarity of a rotor in said fan motor;
   a first transistor having a collector connected to a fan motor power input through a first magnetic coil, an emitter connected to a grounding line, and a base connected to an output terminal of said Hal effect sensor;
   a second transistor having a collector connected to said fan motor power input through a second magnetic coil, an emitter connected to said grounding line, and a base connected to the collector of said first transistor, wherein the improvement comprises;
   a first capacitor for connection at a first electrode to the collector of said second transistor and a second electrode connected to said grounding line through a resistor;
   a field effect transistor having a gate connected to the second electrode of said capacitor, a drain connected to said grounding line, and a source connected to an external power source through a pull-up resistor, said external power source being different from said fan motor power input, the source of said field effect transistor being provided for signal detection;
   a diode for connection at the anode to the second electrode of said first capacitor and at the cathode to the gate of said field effect transistor; and
   a second capacitor connected between the cathode of said diode and said grounding line.

2. The drive circuit for a DC brushless fan motor as claimed in claim 1, wherein said field effect transistor is an enhanced nMOS transistor.

3. The drive circuit for a DC brushless fan motor as claimed in claim 1, wherein said field effect transistor is an enhanced nMOS transistor.

* * * * *